Dec. 8, 1959 W. L. DOELP, JR 2,916,604

FABRICATION OF ELECTRICAL UNITS

Filed Sept. 20, 1957 4 Sheets-Sheet 1

INVENTOR.
WALTER L. DOELP, JR.

BY

F. D. Prager

ATTORNEY

INVENTOR.
WALTER L. DOELP, JR.
BY
F. D. Prager
ATTORNEY

Dec. 8, 1959 W. L. DOELP, JR 2,916,604

FABRICATION OF ELECTRICAL UNITS

Filed Sept. 20, 1957 4 Sheets-Sheet 3

INVENTOR.
WALTER L. DOELP, JR.
BY
F. D. Pongo[?]
ATTORNEY

INVENTOR.
WALTER L. DOELP, JR.
BY
F. D. Prager
ATTORNEY

United States Patent Office 2,916,604

Patented Dec. 8, 1959

2,916,604

FABRICATION OF ELECTRICAL UNITS

Walter L. Doelp, Jr., Doylestown, Pa., assignor to Philco Corporation, Philadelphia, Pa., a corporation of Pennsylvania Application September 20, 1957, Serial No. 685,232

4 Claims. (Cl. 219—85)

This invention relates to methods of and apparatus for the fabrication of semiconductor devices and the like, and particularly to the securement of electrodes of such devices to conductive members, for instance to connector wires and heat sink elements. The invention has special utility in the fabrication of so-called alloy junction transistors, as used for instance in certain power transistor devices, and it will be described in connection with the fabrication of such a device.

A primary object of the invention is to accelerate such fabrication while consistently maintaining predetermined characteristics in each fabricated device. According to the most effective techniques heretofore available for the production of transistors, it was necessary either to use methods wherein predetermined characteristics of the product could not be consistently maintained, which was economically unsound, or to resort to very time-consuming methods, involving for instance the use of certain procedures of immersion heating and/or the establishment of certain thermal shielding arrangements, whereby the cost of the ultimate product was substantially increased. It is one of the particular objects of this invention to avoid such complications, costs and losses of time.

Another important object is to provide means and procedures of greater simplicity and effectiveness than were heretofore available for the soldering of metallic conductors to minute portions of electrode elements. Heretofore, unless difficult and wasteful procedures were used, trouble was encountered due to deleterious effects of heat and other agencies. Moreover such trouble could usually be detected only after the completion of complex cycles of fabricating operations, including not only the steps involved in the attachment of conductors to the electrode elements but also a variety of further difficult and costly operations. The present invention, by contrast, provides a method of and device for attaching the required connector wires, heat sink members, etc., to the electrode elements, with safety and consistency as well as with considerably enhanced rapidity. Additional objects will appear from the description which follows.

While the present invention is applicable to the fabrication of a great variety of devices, it will be described particularly as applied to the production of power transistors of the alloy junction type, wherein a pair of electrodes are formed on two sides of a flat semiconductor blank and wherein, correspondingly, problems are encountered with respect to the securement of conductors to the electrodes. Some of these problems are encountered only in the work involving one of said electrodes, the so-called "collector," while others pertain to the other electrode, the so-called "emitter," or to both electrodes. The invention, as applied to the fabrication of transistors of the indicated type, provides devices and methods for establishing connections to such electrodes, and several of the new means or operations are applicable for connecting either electrode, while other aspects of the invention have to do only with the securement of one type of electrode to the conductor for the same. In the preferred form of the process, a metal-melting and metal-dissolving treatment is used on the collector side and a metal-melting treatment on the emitter side. Both operations are performed very rapidly, by means of special method and apparatus features.

These and other features of the invention will be understood upon a study of the description of preferred devices and instruments, contemplated in accordance with this invention and shown in the drawing appended hereto.

Figure 1 of said drawing is an enlarged, vertical, central section, schematically showing one of the workpiece members or subassemblies whereto the new method is applied.

Figure 2*a* is a section on a larger scale, similarly showing a second workpiece member or subassembly.

Figure 2*b* is a similar section, on the scale of Figure 2*a*, showing the first and second workpiece members united with one another and with a third workpiece.

*The new method*

Figure 1:
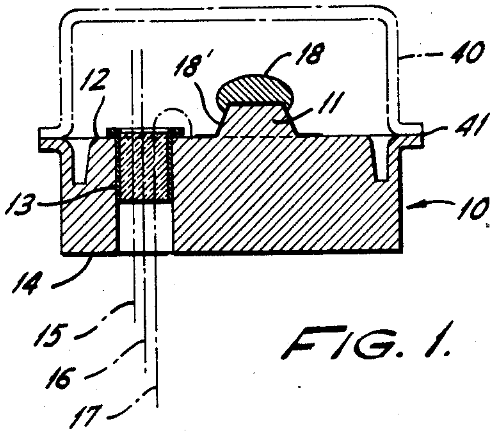
Figure 2A:
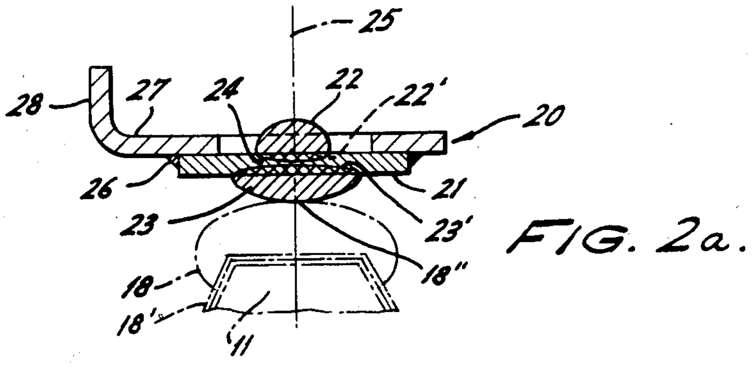
Figure 2B:
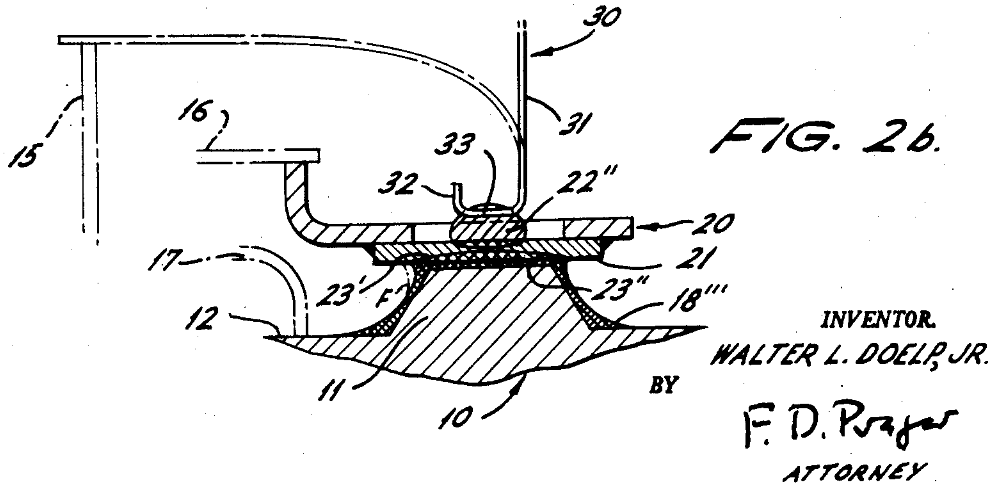

Workpieces 10, 20 and 30, best shown respectively in Figures 1, 2*a* and 2*b*, are used as starting materials. The method serves to produce the unit 10, 20, 30, illustrated in Figure 2*b*.

I

It will be best to consider first that phase of the method during which a heat sink member 10 is united with a semiconductor unit 20, which phase constitutes an improvement over the invention of C. G. Thornton described in his application Serial No. 590,204, filed June 8, 1956, entitled "Fabrication Method" and assigned to the assignee of this invention.

In Figure 1 the workpiece 10 is shown as a metallic slug having an integral pedestal or boss 11 upstanding from a top surface 12, for the support of a semiconductor and electrode subassembly 20 (Figure 2*a*). The latter subassembly may thereafter be provided with an electrode connection wire 30, opposite the slug 10 (Figure 2*b*).

The parts 10, 20, 30 must be electrically connected with suitable circuitry. For this purpose a glass bead eyelet 13 (Figure 1) extends from adjacent the top surface 12, through the slug 10, and toward the opposite or bottom surface 14, and lead wires 15, 16, 17 extend through the glass bead. The upper ends of said wires 15, 16 and 17 are, respectively, connected (Figure 2*b*) to certain parts of the emitter connection member 30, the transistor member or subassembly 20 and the collector slug 10. A semiconductor blank 21, forming the principal part of subassembly 20, is shown as being secured by a solder joint 26 to a tab 27, this tab having a lug 28 for securement to wire 16. The connections 17—10 and 21—27 may be established prior to the operations involved in the present method (see Figures 1 and 2*a*); the other connections are made thereafter. In order to protect the device, a metallic closure or so-called hat, 40, may subsequently be cold-welded to the support slug 10, in a flange region 41, Figure 1.

The transistor electrode subassembly 20 (Figure 2*a*) comprises a small, flat blank 21, made for instance of germanium or the like. A first phase of the fabricating process involves the production of this subassembly, that is, the provision of a bead-shaped emitter electrode member 22 in an upper central part of said blank and of a slightly larger, similarly shaped collector electrode member 23 in a lower central part thereof. These operations may be carried out in any suitable ways, which need not be described herein. The emitter electrode is preferably made of pure indium, with a controlled admixture of gallium, and the collector electrode is preferably made of pure indium without admixture.

As a result of this first phase of the process, the unit 20 comprises regions 22', 23' of alloyed, recrystallized germanium and indium, or so-called "P-type" material, which regions are shown as extending from electrode members 22, 23 into the germanium body 21 and as being defined by boundaries or junctions, indicated by broken lines in Figures 2*a*, 2*b*. The said junctions are spaced apart by a flat and extremely thin layer or so-called base region 24 of unalloyed semiconductor material, or so-called "N-type" material, disposed within and parallel to the blank 21. In many cases the thickness of this base region 24 amounts only to a small fraction of a mil.

It is a matter of great importance for the success of the device that the relation between the small regions or bodies 22 and 22', established in the production of the unit of Figure 2*a*, should not be disturbed and in fact not greatly modified in the process of securing workpiece 30 to electrode 22. It is of equal importance that the similarly established relation between the small bodies or regions 23, 23' should not be disturbed in undesirable manner, although it must be modified to a substantial extent, in the process of securing pedestal 11 of heat sink 10 to the electrode 23. Heretofore the best practice, in both of these phases of the fabrication process, involved the use of certain immersion techniques, as particularly described in the above-mentioned Thornton application with respect to the attachment of the collector heat sink, and it was believed that the gradual performance of certain heating processes, provided by such immersion, was essential for the production of satisfactory semiconductor units. Upon an intensified study of the processes involved it has now been found that, subject to certain precautions, a relatively abrupt and sudden application of heat can be utilized, thereby greatly improving the fabrication process as to the speed and economy thereof, while maintaining high and satisfactory quality of the ultimate product.

A feature of importance in this connection has to do with the provision of a secondary collector soldering element or bead 18 (Figure 1), which desirably consists of a cadmium-indium mixture and particularly of the "eutectic" of said materials. This soldering element is initially secured to a surface 18' on the boss 11, which surface may desirably be "tinned" with pure indium and which is positioned opposite the electrode member 23 (Figure 2*a*). The beads 18, 23 are rounded so as to make it possible to initially establish a small area 18'' or so-called "point" of contact therebetween, and the mass and volume of the bead 18 is so selected that upon the subsequent melting thereof, it can dissolve all of the indium 23 and 18' and no more.

In the process according to the present invention the eutectic-indium contact area 18'' is exposed to a temperature high enough to melt the eutectic 18 but not high enough to melt the indium 23, this narrow control being applied in order to avoid disturbance of the alloy region 23'. As the eutectic 18 melts and liquefies, which occurs as soon as the temperature thereof rises to the slightest extent above a very sharply defined melting and freezing point, the liquid eutectic rapidly dissolves the indium 23 and becomes indium-rich. The resulting liquid metal then flows along the sides of the boss 11, partly by virtue of the inherent adhesion of this liquid metal to the indium layer and partly by virtue of mechanical pressure which is maintained on the contact area 18'' and on the eutectic-indium interfaces existing during the rapid, more or less momentary, melting and dissolving process.

Thus the original solder member 18 and electrode member 23 are rapidly converted into a homogeneous and very thin electrode layer 23'' of indium-rich cadmium-indium alloy, which adheres both to the top surface of boss 11 and the bottom surface of blank 21, Figure 2*b*. The ultimate thickness of this layer 23'' is controlled by the cohesion of the liquid metal therein, and the layer remains solid and imperforate under such pressures as are applied thereto in the process according to this invention. The required, accurately parallel relationship between the blank 21 and the top of boss 11 is insured by suitable guiding mechanism, as will be described hereinafter. The excess of enriched alloy, flowing along the indium tinned surfaces 18' of the boss 11 and slug 10, forms a fillet 18''' on said surfaces.

A feature of great importance for the present process is that substantially all of the heat provided for melting the eutectic and dissolving the indium is supplied to these materials by conduction through the slug 10. It seems to be largely by virtue of this feature that it is no longer necessary, as it was in the immersion process previously employed, to control the successive temperatures of all thermally coupled elements so as to insure a gradual tapering off of the rate of heating up. It is, however, important that the rapid heating of the various parts, and particularly of the particles of eutectic, be controlled, in a way which differs greatly from the control heretofore applied, for instance in accordance with the immersion heating method. In this connection the following should be noted.

Figure 3:
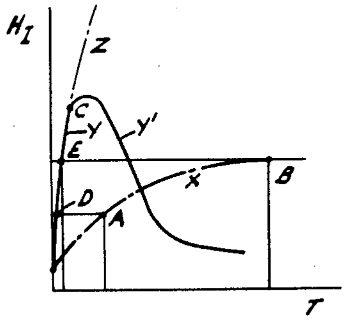
Figure 3 is a graphic representation of certain functions forming part of the new method.

A comparison between the new and the former process appears in Figure 3. In this figure the heat input into the indium, to be dissolved along the interface 18'' and the aforementioned subsequent interfaces, is shown at $H_I$, while time is plotted along axis T. The broken line curve X is representative of the manner in which an immersion process, for instance that of said Thornton application, supplied heat to the eutectic body and thereby caused the dissolving of the indium body. The heating process in that case was gradual and gentle, as indicated by the slight and gradually decreasing inclination of the curve X from a horizontal direction. At point A on the curve, sufficient heat had been supplied to the eutectic, along a variety of paths of heat transfer, to melt the first particles of the eutectic, which was promptly followed by the dissolving of the first particles of indium. Due to the provision of a finite although small mass of eutectic and of indium, and due to the gentleness of the heating process, all of the eutectic had been liquefied only at point B on the curve. At that same point, or substantially so, all of the indium had been dissolved. On the axis T, point B corresponded for instance to a time lapse of twenty or thirty seconds after the start of the process. Due to the gradual type of heating employed, the temperatures of the pedestal were never significantly higher than those of the indium.

The full line curve Y shows, for comparison, the heat input applied to the indium according to the present invention. It will be noted that the initial rise of this curve is much steeper than that of curve X, and correspondingly the heat input into the pedestal is still more rapid, so that it may briefly and locally establish extremely high temperatures, in the pedestal. If the heat input into the indium, curve Y, were allowed to continue upwardly, as indicated at Z, it would ultimately level off, in a manner similar to that of curve X, but this would happen only after a heat input of such magnitude as to destroy the electrode members and associated parts. Actually, however, this heat input, as shown by the rise of the curve Y, is interrupted at or adjacent a predetermined point C, where it has not as yet created a temperature, anywhere in the pure indium, sufficient to melt this material. When this point C has been reached, the input of heat is interrupted and cooling of the small electrode assembly is initiated, as indicated by the turning and the subsequent falling of the curve Y′.

Heat input values, corresponding to those shown at A and B on the curve X, are indicated at D and E on the curve Y, both of these points lying below the point C and on the steeply rising and substantially straight part of the curve. It will be seen that the completion of the heat input, which substantially coincides with the completion of the dissolving process, can be achieved in a time interval much shorter than that allowed in the immersion process. For instance, a heating period of one or two seconds, or sometimes a small fraction of a second, has been found sufficient, in the use of the new method. The protection against overheating of indium, which in the case of curve X was obtained by the gradual decrease in the rise of the curve, is here obtained by the interruption of the original, much steeper curve, at point C.

It has been found that substantially no loss, as to consistency of production of satisfactory semiconductor assemblies, is incurred by the change from the gradual immersion heating to the more rapid, suitably interrupted heating, effected entirely by conduction through the slug and pedestal. Particularly, the new process has been found to be substantially free from the danger that asymmetrical flow of metal occurs at some points, such as that shown at F, in Figure 2*b*, where some minute amounts of liquid metal 23″ might flow beyond the exact boundary of the recrystallized alloy zone 23′. The danger of such minute overflowing of the solder-like material 23″ is ever-present, particularly since it is not always possible to insure the required symmetrical fluxing of the pedestal area to be wetted by the metal. If and when such overflowing occurs, it can seriously impair the utility of the transistor. The new process, in spite of the momentary use of high temperatures, effectively avoids such overflowing, and other dangers and difficulties.

II

Referring now to the completion of the assembly of Figure 2*b* by the attachment of the emitter-connector 30, Figure 2*b*: in this phase of the process, a heating and melting treatment must be applied with extreme care and to an extremely limited top portion of the emitter electrode member 22 for the attachment of the connecting member 30 thereto. It is necessary at this stage of the process to utilize a heat-bonding procedure which not only avoids disturbance of the semiconductor alloy regions 21′, 23′ but also avoids disturbance or shifting of the newly formed, thin layer 23″ relative to electrode 23′ or boss 11. Nevertheless it is desirable to utilize a process which is simpler than that involving the use of eutectic alloy mixtures or the like.

Accordingly, a small, preformed emitter-connecting member 30 is employed, which can serve as a heating element in the fabricating process. This member is made of thermally and electrically conductive metal, and is shown as comprising a pair of vertical arms 31, 32, interconnected by a horizontal web 33, to form a generally U-shaped structure which can be temporarily gripped by a pair of connector electrode members. One arm 31 may be relatively long, in order to facilitate the subsequent, permanent attachment thereof to lead wire 15.

Controlled amounts of heat are applied to the web 33, and thereby to the indium 22, for instance by the apparatus to be described hereinafter, whereby the heat to be applied is generated in and limited to a very localized region, particularly the web 33 between arms 31, 32. This web conducts most, if not all, of the so-generated heat directly into the adjacent indium of the emitter connection member 22, which is contacted by the web for this purpose. The amount of heat so supplied is narrowly controlled, to make sure that it is only the temperature at 33 which at any time reaches or slightly exceeds the melting point of indium, and that only for a very short time interval. This operation allows the web member 33, when effectively weighted or biased, to sink into successive softened portions of the indium bead 22 and to allow the solder-like material of the bead to contact extended bottom and side surfaces of web 33, and, if desired, top surfaces thereof, so that a good solder bond results upon the subsequent congealing.

It is important that the heat supply at 33 be limited, as described, in order to avoid any deformation, for instance as shown at F, of the previously established metal structure in the thin collector solder joint or bonding layer 23″. This is facilitated by the fact that the indium of bead 22 is a rather poor conductor of heat. Furthermore, there is present in the bead 22 a relatively large amount 22″ of indium, below the lowermost position to which the connecting member 30 is allowed to sink. As a result, all temperatures in 22″, 22′, 24, 23′ and 23″ remain substantially lower than at 33.

*The new apparatus*

Figure 4:
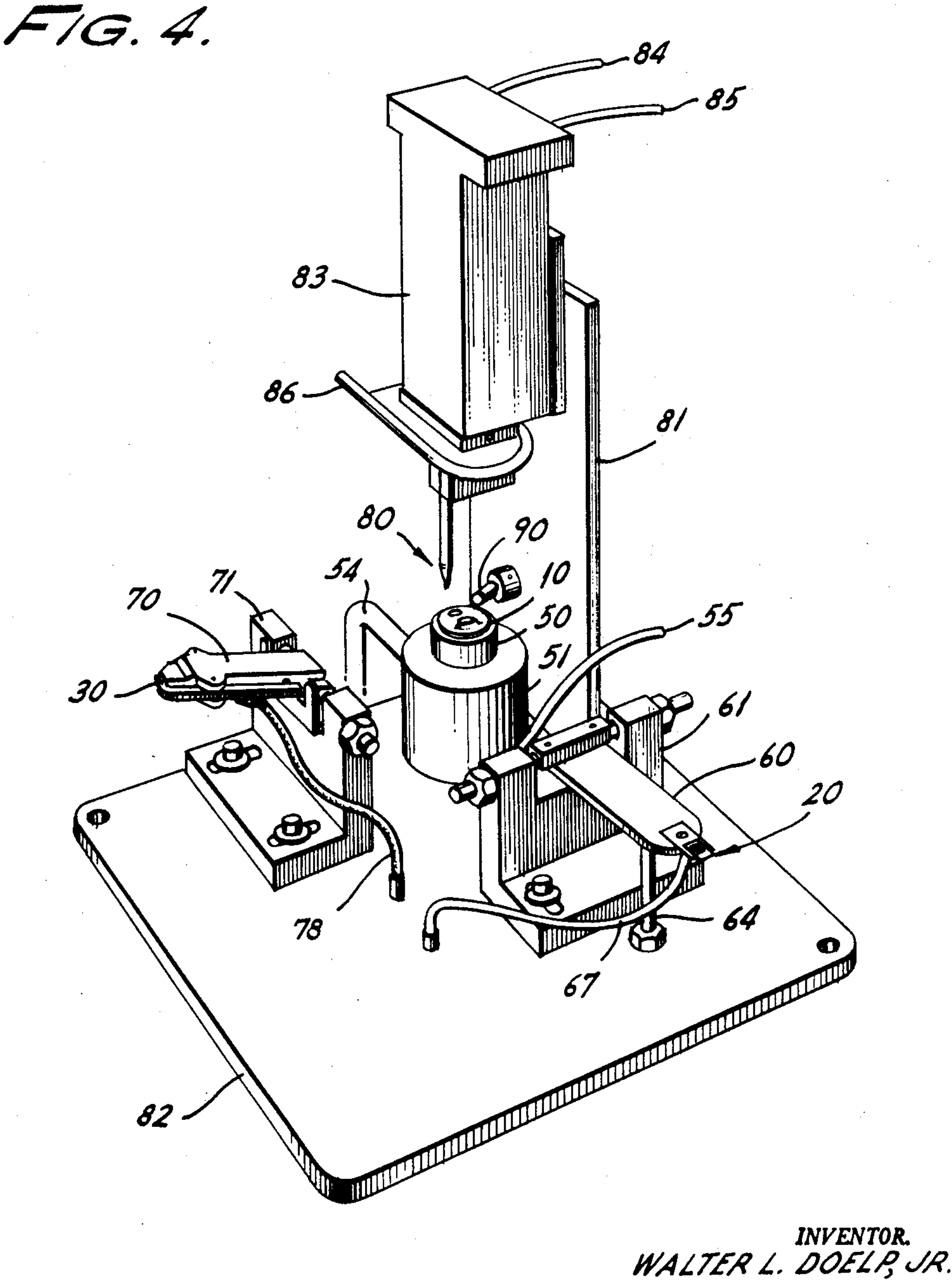
Figure 4 is a perspective view on a reduced scale of preferred apparatus for the assembly of the said workpiece members, the apparatus being shown in an initial operative position thereof.
Figure 5:
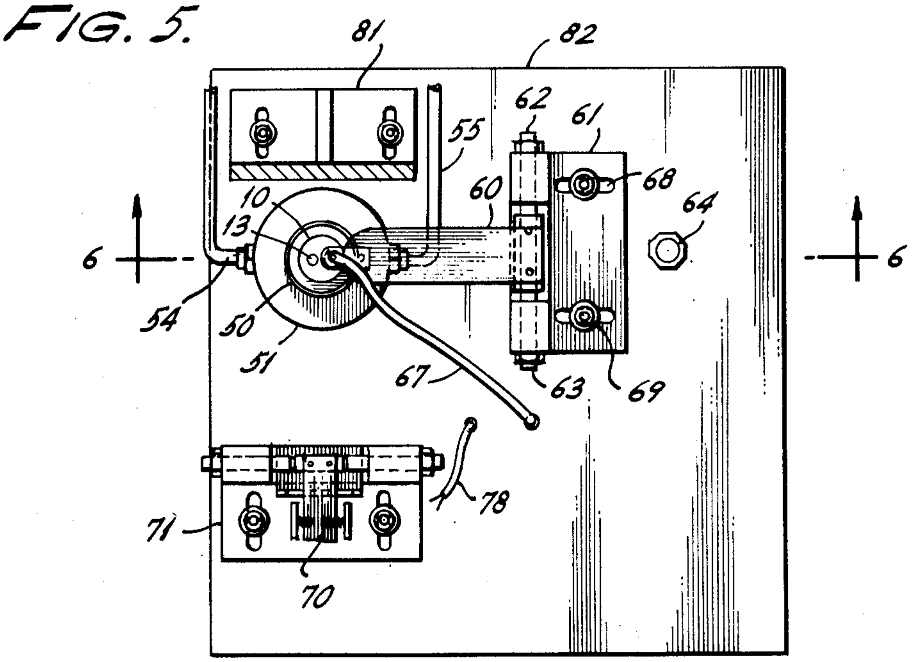
Figure 5 is a plan view of the same apparatus in a subsequent operative position thereof, certain overlying parts being broken away to facilitate the disclosure of other parts, which are used for uniting two of the workpiece members.

In Figure 4, the principal parts of the new apparatus are shown, including a holding and cooling device 50 for the heat dissipating slug 10; a holder and micro-manipulator 60 for the semiconductor assembly 20; a holder, micro-manipulator and soldering assembly 70 for the emitter connecting member 30; and a heating electrode assembly 80 cooperating with the parts 50 and 60 in joining the parts 10 and 20. The holders 50, 60, 70, 80 are respectively mounted on supports 51, 61, 71, 81, which in turn are suitably secured to a base plate 82, as best shown in Figure 5. It will be noted that the slug holder and support members 50, 51 are substantially stationary on this plate, whereas members 61, 71 and 81 are adjustable and movable relative to this plate, for proper indexing and manipulation, so that (Figure 4) members 61 and 71 are successively movable toward and away from boss 11 of a slug 10 on support 50, while member 81 is movable toward and away from another area on the top surface of such a slug 10.

Figures 6, 7:
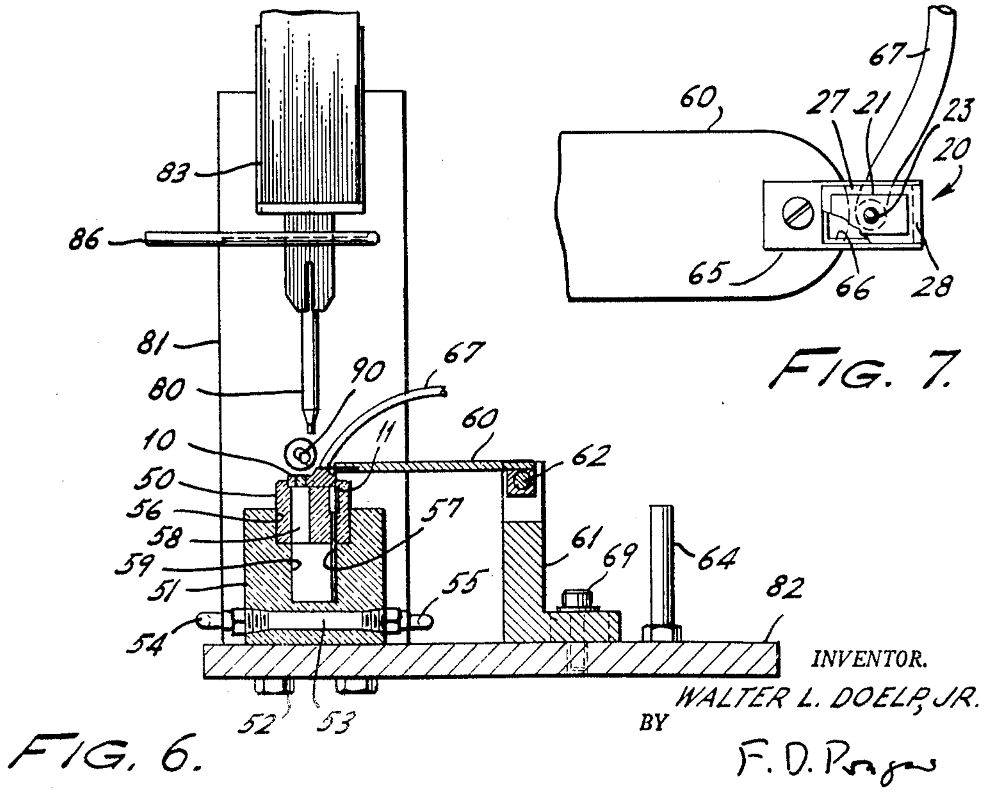
Figure 6 is a section taken along line 6—6 in Figure 5 and including certain parts broken off in that figure.
Figure 7 is an enlarged detail, in a position similar to that shown in Figure 4, of a portion of the apparatus of Figures 5 and 6.

Referring more particularly to the support 51 and holder 50 for the slug 10, as shown in Figures 5 and 6, it may be noted that the support 51 can be formed for instance as a metal cylinder, fastened to the base plate 82 by bolts 52. This cylinder member is shown as having a diametrical passage 53 with terminal connections 54, 55 for cooling fluid in order to prevent objectionable accumulation of heat in this member upon consecutive applications of heat thereto through the elements 80, 10 and 50. The slug holder 50 may be inserted in a suitable recess 56 in the top of support cylinder 51; and rotation of the slug 10 in the holder 50, or of the holder 50 in the support 51, may be prevented by dowel means 57 or the like. Recesses 58, 59 may be formed in the members 50, 51 to accommodate the lead wires 15, 16, 17 (Figure 1).

As further shown in the aforementioned Figures 5 and 6, the transistor blank holder 60 may have the general form of a swingable rigid arm and may be connected with a support bracket 61 for the same by means of precision bearings, shown as incorporating pin and socket members 62, 63. The arrangement of the bearings 62, 63 and of the arm 60 is such that the tab 27 of a properly formed transistor blank subassembly 20, held in the free end of the arm 60 (Figure 7), is accurately registered with the boss 11 of any slug 10 in holder 50, when the arm 60 is manually or automatically swung into the position shown in Figure 6, thereby contributing to the rapidity of operations according to this invention.

Insertion of the blank assembly 20 in the arm 60 can conveniently be performed, in a reverse position of the arm (Figure 4), wherein this arm rests on a support 64. In this last-mentioned position, the arm 60 exposes a holder 65 for the transistor blank assembly 20, as shown in Figure 7; that is, the blank 21, with its base tab 27, can readily, snugly and accurately be inserted in a recess 66 of the holder 65, so as to expose the collector electrode element 23 upwardly. Thus the said element 23 is exposed downwardly when the arm is reversed, as shown in Figure 6, and is properly indexed relative to the boss 11 of slug 10 in holder 50. In order to releasably hold the tab 27 in the recess 66, there may be provided a flexible tube 67, having one end communicating with a source of sub-atmospheric pressure and the other end connected, through the holder 65, with the recess 66 which accordingly serves as a vacuum cup.

In the initial adjustment of the apparatus it may be necessary to shift the support 61 relative to the support 51, under suitable microscopic supervision, in order to insure the aforementioned, accurate registry of successively inserted blank assemblies 20. In other words, the bosses 11 of successive slugs 10 must be oriented identically, not only relative to heating electrode 80 but mainly relative to the minute elements of the transistor unit 20 in micro-manipulator 60. For this purpose, the support 61 may have, for instance, elongated apertures 68 for the bolts 69 whereby it is secured to the base plate 82.

As further indicated in the aforementioned Figure 6, there is provided a means for controlled supply of heat, in accordance with curve Y (Figure 3), for the above-described melting of eutectic 18 on boss 11 and the consequent dissolving of indium of collector electrode member 23. Such heat is provided by means of the aforementioned heating electrode 80 (Figure 6), which may be of suitable resistance soldering type. The electrode may have the form of a vertically extending pin, which can be raised or lowered hydraulically or pneumatically by a cylinder structure 83, suitably mounted on support 81. Fluid connections 84, 85 (Figure 4) are provided for this purpose, while electric current, for heating purposes, may be supplied to the electrode 80 by a conductor 86. The conductor may be hollow and may also serve as a duct for cooling fluid.

By means of suitable control means of well-known type, not shown, the heater electrode mechanism 84, 85, 86 is controlled to raise and lower the electrode 80 and to supply it with pulses of electrical energy, in a cycle controlled in accordance with the above-described method, providing particularly the rapid and promptly interrupted heat input Y, graphically shown in Figure 3. As the so-provided heat melts the eutectic bead 18 on the slug 10, causing the molten eutectic to dissolve the indium 23 on the blank 21 (Figure 2*a*), the pivoted arm 60 (Figure 6) keeps the blank assembly 20 in contact with the laterally flowing and vertically receding liquid mixture so formed, and under pressure thereagainst, which may be controlled by suitable weighting of the arm.

When this rapid heating is interrupted, the thin layer 23" (Figure 2*b*) has been formed and congeals readily. The congealing can be further accelerated by a supply of cool, inert gas from a nozzle 90, directed against the boss 11. Additionally, such gas may be applied to provide the proper atmosphere during the heating process, and to make sure that the heating of solder 18 occurs only by conduction through the metal of slug 10.

When semiconductor 20 has thus been secured to slug 10, the connection of the flexible tube 67 to the source of sub-atmospheric pressure may be interrupted by suitable valve means, not shown, and atmospheric pressure may then be admitted to said tube, whereupon the arm 60 can be freely swung back from the position of Figure 6 into that of Figure 4. The semiconductor assembly 20 remains on the slug 10, while the holder 65 can be reloaded with a new semiconductor assembly, Figure 7.

Figure 8:
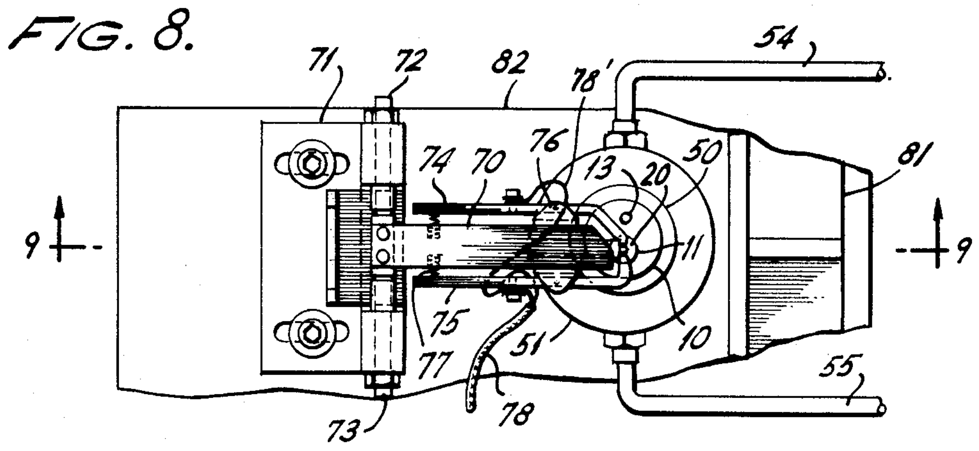
Figure 8 is a fragmentary plan view showing certain parts of the apparatus of Figure 4, in an operative position different from those of Figures 4 and 5, to disclose the mechanism for uniting another two of the workpiece members.
Figure 9:
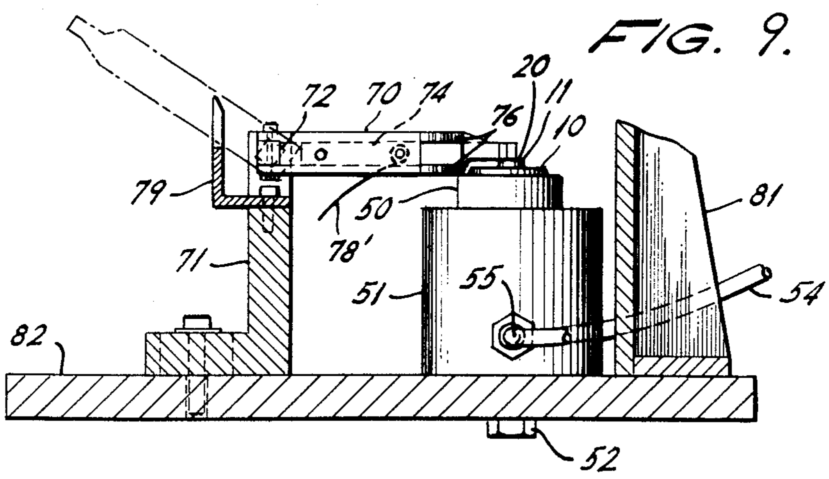
Figure 9 is a view taken along line 9—9 in Figure 8.
Figure 10:
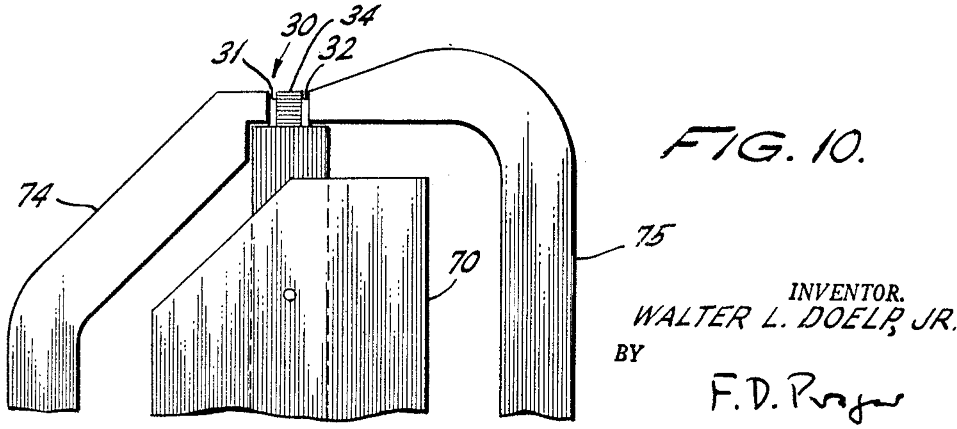
Figure 10 is an enlarged detail from Figure 8.

The semiconductor-collector unit 10, 20 is provided with an emitter connector by means of the manipulator tools illustrated in Figures 8 and 9, while the slug 10, now having the unit 20 thereon, may remain in the position previously established by holder 50, as described. The tools now employed comprise the swingable arm or manipulator 70, held on precision bearings 72, 73 similar to those of the arm 60, the present arm 70 being desirably formed of an electrically insulating material and having a pair of metallic fingers 74, 75 pivoted thereto, opposite one another, by clevis or bearing members 76, for clamping movements in a horizontal plane. The free ends of these fingers are urged toward one another by spring means 77 reacting against other parts of the fingers. Flexible conductor members 78', in cable 78, supply electrical potential to the fingers 74, 75. Figure 10 shows the front ends of these fingers, clamping the preformed emitted-connecting member 30 and feeding electrical current thereto. Mechanical distortion of the arms 31, 32 of member 30, by the clamping force, is avoided by an electrically insulating core 34, inserted between these arms and carried by arm or lever 70. This core also serves to prevent thermal welding of said arms 31, 32 to the fingers 74, 75 incident to the rapid and intense heating of the member 30. The lever 10, when inoperative or when being reloaded with a new electrode 30, may rest on a bracket 79 (Figure 9). The support 71 for the lever 70 may be adjustable in the same way as support 61 for lever 60, by fastening bolts in elongated bolt holes or equivalent means (Figure 8).

The operation of the machine will readily be understood in the light of the foregoing disclosure. Initially the apparatus is in the position of Figure 4. A slug 10, constructed and prepared as shown in Figure 1, is inserted and oriented in the slug holder 50 and is then provided with a layer of flux on coating 18. A transistor subassembly 20 is inserted in the recess 66 at the end of arm 60, Figure 7, and an emitter connector 30 is inserted between the fingers 74, 75 of the arm 70. The fingers may for this purpose be manually retracted by pressure against their free ends, visible at the left of the springs 77 in Figure 8. A partial vacuum is maintained in the hose 67 and cooling fluid circulates in the ducts 54, 55 and 86, Figure 4. Next, the arm 60 is brought into the position shown in Figures 5 and 6; fluid pressure is then applied at 84, 85 (Figure 4) to lower the electrode 80 into suitable contact with the slug 10 (Figure 6); and a pulse of electrical current is then sent through electrode 80 and slug 10, causing the characteristic pulse Y of heat input (Figure 3) and the aforementioned melting of eutectic and dissolving of indium, which results in the desired bonding between the transistor blank 21 and the collector-support 11 thereof (Figure 2*b*). Meanwhile a supply of inert gas can be discharged from nozzle 90 (Figure 4).

The pressure connections 84, 85 can then be reversed to withdraw the electrode 80 upwardly. Atmospheric pressure is now admitted to the tube 67, so that the arm 60, without the transistor subassembly 20 therein, can be returned to the original position.

Arm 70, with an electrode member 30 thereon, is then placed in the full-line position of Figure 9. Again a suitably predetermined pulse of current is supplied, this time through the conductors 78' and so as to effect the limited melting of emitter solder as described, while a further supply of cool, inert gas may desirably be admitted at 90, Figure 4. Lever 70 is then returned to the broken line position shown in Figure 9. It may be left mechanically connected to member 30, so that it lifts this member with members 20 and 10 thereon, from support 50. Connector 30 is then disengaged by again spreading the fingers 74, 75 apart. The transistor assembly is now ready for further fabricating operations, including mainly attachment of leads 15, 16 (Figure 2*b*) to units 20, 30 and encasement under hat 40 (Figure 1). New units 10, 20, 30 are then inserted in holders 50, 60, 70, respectively.

It will be seen that the individual operations required for the fabrication of a unit 10, 20, 30 may follow one another in a simple cycle of consecutive operations wherein each member 60, 70, 80 approaches the support 50 once and then returns to an original position; the said members, in their said original positions, being ready to start a new, identical cycle. In spite of the rapidity and simplicity of this cycle, the critical and hitherto difficult task of performing the required soldering operations, without damage to the once established regions 22', 23', 22", 23", is successfully performed. The process may be carried out manually, semi-automatically or by full automatic instrumentalities of suitable kind, not shown.

While only a single way of performing the new method and only a single embodiment of the new apparatus have been described, it should be understood that the details thereof are not to be construed as limitative of the invention, except insofar as is consistent with the scope of the following claims.

I claim:

1. In apparatus for fabricating semiconductor units and the like: support means for holding a metallic connector member in a predetermined orientation relative to said support means, and in stationary conditions; heating means, oriented for movement along a predetermined path relative to said support means, for contacting and for thereafter momentarily, intensely, conductively heating the connector member; carrier means, oriented for movement along an independent, predetermined path relative to said support means; and means for selectively holding a semiconductor blank inserted on said carrier means, in predetermined orientation relative to said carrier means, during the latter movement, and releasing the semiconductor blank from the carrier means after said heating.

2. In apparatus for fabricating semiconductor units: means for releasably holding a connector member and for moving it along a predetermined path; means for holding a semiconductor, electrode and solder structure for engagement by said connector member, in a position indexed with said path; and means for intensely, conductively heating only a small part of the connector member, directly adjacent said solder structure, to melt only part of said solder structure.

3. In apparatus as described in claim 2, the feature that the first means comprises a rigid, swingable lever arm, finger means mounted thereon; and resilient means for biasing the finger means to hold the connector member between the finger means and the arm and to apply electrical heating to said small part of the connector member.

4. Apparatus for fabricating power transistors comprising: support means for holding a collector pedestal and heat sink member in a predetermined stationary position; a pair of carrier members, each capable of independent movement in a predetermined path relative to said support means; means on one of said carrier members enabling it to releasably hold a transistor blank and electrode unit in predetermined orientation relative to said member; means for rapidly and intensely heating the collector pedestal and heat sink member and for thereby heating the transistor blank and electrode unit when the latter is held to the collector pedestal and heat sink member by said one carrier member; and means on the other carrier member enabling it to releasably hold an emitter connector in predetermined orientation relative to said member and to intensely heat a small portion of said connector while so holding it.

References Cited in the file of this patent

UNITED STATES PATENTS

| | | |
|---|---|---|
| 1,435,470 | Hosford | Nov. 14, 1922 |
| 1,807,971 | Day | June 2, 1931 |
| 2,602,872 | Ziegler | July 8, 1952 |
| 2,705,768 | Kleimack et al. | Apr. 5, 1955 |
| 2,767,324 | Pearson | July 31, 1956 |
| 2,784,300 | Zuk | Mar. 5, 1957 |